3,202,464
AUTOMATIC LOAD CONTROL
Jacques Pierre Chaboseau, Brevannes, Seine-et-Oise, and Christian Mech, Paris, France, assignors to Societe Rateau, Paris, France, a company of France
Filed May 28, 1963, Ser. No. 283,776
Claims priority, application France, Jan. 22, 1963, 922,141
9 Claims. (Cl. 308—73)

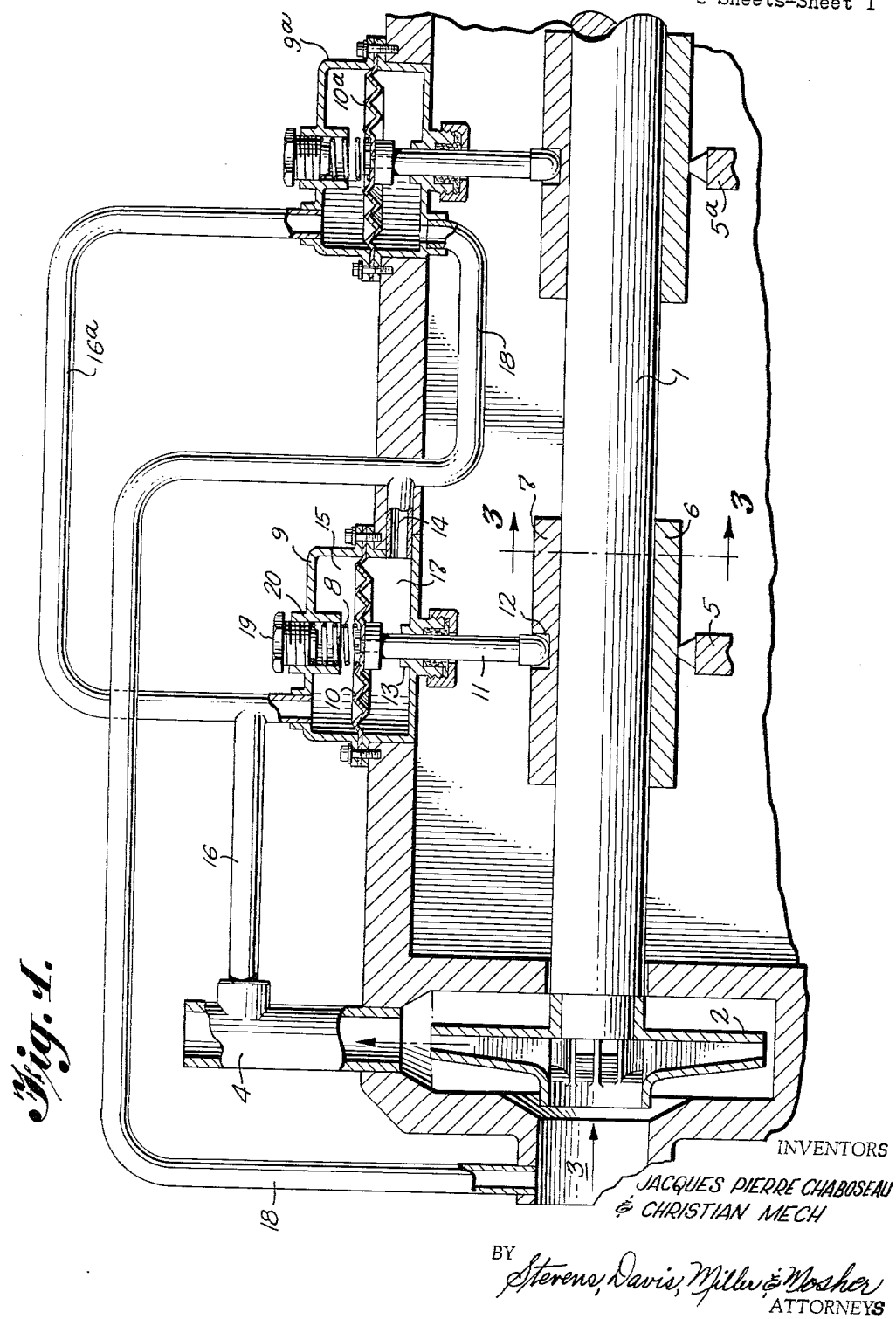

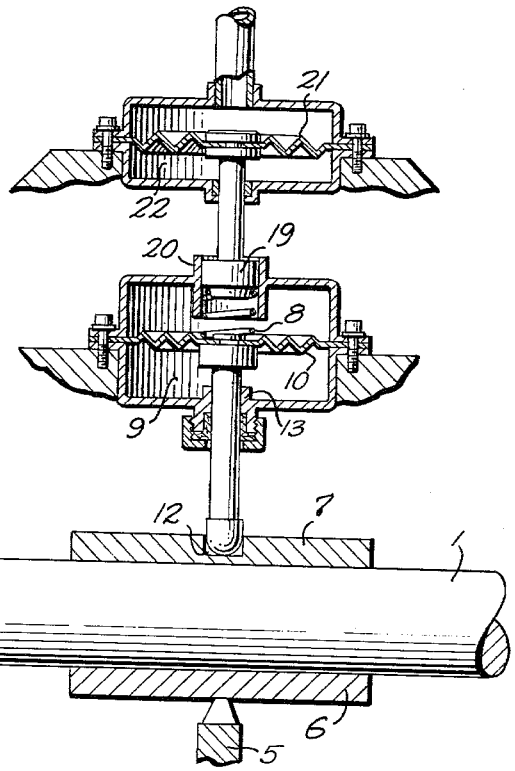
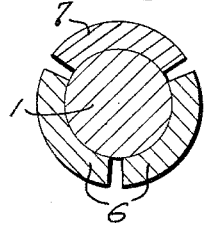
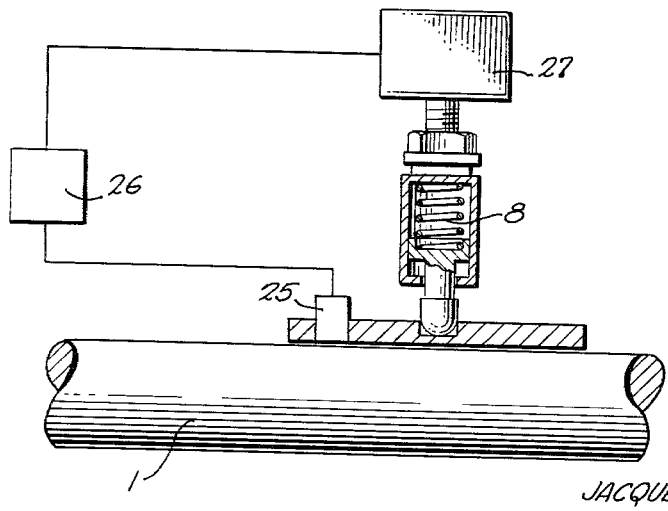

The invention concerns hydrodynamic bearings comprising several (usually at least three) slippers.

Among the principal parameters on which the proper operation of a multi-slipper hydrodynamic bearing depends are the following:

(a) the viscosity of the lubricating medium;
(b) the relative speed U of movement of the opposed surfaces;
(c) the load P carried by each slipper;
(d) the ambient pressure (in the case of a hydrodynamic gas bearing).

For a given value of the above parameters, all other things being equal, there results under hydrodynamic conditions a thickness $h_0$ of the lubricant film. This thickness $h_0$ must be higher than a given value $h_1$ in order to obtain operation without actual contact between the moving member and its supports with a suitable safety margin. It must be lower than another value $h_2$ in order that the operation is stable.

In certain cases, the parameters may vary widely during operation of the bearing and the value of $h_0$ is liable to move outside the above-mentioned limits necessary for proper operation. For instance, the viscosity may alter if the nature of the lubricating medium changes or if the temperature varies. The speed U may vary considerably, for example from 1,000 to 24,000 revolutions per minute. The pressure of the ambient gas may change in the course of operation.

The load P carried by each slipper may include a component due to a pre-load system usually employed in bearings of this kind. Up to now, a single setting of the pre-load system has been used, intended to provide a thickness $h_0$ of the lubricant film within the aforesaid limits for all conditions of use of the machine. However, variations of the parameters may be too great for the setting of the pre-load system to suffice in all circumstances.

It is an object of the present invention to provide means for avoiding or minimising this disadvantage.

To this end, the invention provides a hydrodynamic bearing having a plurality of bearing slippers disposed around the bearing axis at least one of which slippers is radially movable, loading means for applying an external load to said radially movable slipper urging it towards the bearing axis and means for automatically controlling the value of the external load applied by the loading means so as to maintain between pre-determined limits the thickness of the lubricant film established under hydrodynamic conditions, despite variation in one or more of the parameters on which the film thickness depends.

The controlling means may be adapted to respond to variations in a selected parameter or parameters on which the film thickness depends so as to give said automatic control. Alternatively, the controlling means may be adapted to respond to changes in the thickness of the film so as to give said automatic control.

This automatic control may (e.g., when related to the relative speed U) reduce starting and stopping problems by lowering the frictional forces under the conditions of dry friction which exist at speeds lower than the transition speed, i.e., the speed at which the supporting hydrodynamic film of lubricant becomes established.

Various means may be used to control the external load on a bearing slipper in accordance with one or more of the parameters on which film thickness depends. For example, in the case of a gas compressor having a rotor mounted on a gas bearing, the load on the bearing slippers may be controlled according to the speed of rotation of the machine by utilising the pressure difference generated by the compressor.

The following is a description, by way of example, of various embodiments of the present invention, reference being made to the accompanying drawing, in which:

FIGURE 1 is a schematic view of a gas compressor mounted on gas bearings having slippers submitted to an external load controlled according to the speed of rotation of the machine, FIGURE 2 shows schematically an arrangement permitting the external load on a slipper to be controlled according to several parameters, FIGURE 3 is a transverse sectional view of one taken along line 3—3 of FIGURE 1, and FIGURE 4 is a diagrammatic representation of means for controlling the external load on a slipper in accordance with changes in the thickness of the fluid supporting film.

Referring to FIGURE 1, a centrifugal gas compressor has a shaft 1 carrying a rotor 2. The compressor draws in gas through an inlet pipe 3 and forces out compressed gas through an outlet pipe 4. The shaft 1 is mounted on two hydrodynamic gas bearings, designated generally by 5 and 5a. Each bearing comprises three slippers equi-angularly spaced around the shaft, namely two lower slippers 6 and an upper slipper 7 (see FIGURE 3). The upper slipper 7 is radially movable under the action of a pre-loading spring 8 which urges the slipper towards the bearing axis. Above the slipper 7 is disposed a pressure vessel 9 of which the interior is separated into an upper compartment 15 and a lower compartment 17 by a flexible diaphragm 10. The central part of this diaphragm is rigidly fastened to a push rod 11 articulated at 12 to the slipper 7. The push rod is slidable in a guide 13 and passes out of the pressure vessel through a fluid-tight gland. The upper compartment 15 is connected by a pipe 16 to the outlet pipe 4 of the compressor while the lower compartment 17 is connected by a pipe 14 to a conduit 18 leading to the compressor inlet pipe 3. The pressure vessel 9 is secured to part of the fixed framework of the machine. The pre-loading spring 8 bears against a seating on the upper side of the diaphragm on the one hand and on the other hand against a cap 19 which is adjustable, e.g., by means of screw-threads, in a tubular member 20 fixed in the top of the pressure vessel 9 around the spring.

The control system for the bearing 5a is arranged in the same way as that of the bearing 5, having a pressure vessel 9a divided into two compartments by a diaphragm 10a, the upper compartment being connected by a pipe 16a to the pipe 16 and the lower compartment being connected to the pipe 18.

It will therefore be seen that the external load applied to the slipper 7 by its push-rod 11 is dependent on the speed of rotation of the machine, since the pressure difference between the compressor inlet and outlet is related to that speed and changes in the pressure difference correspondingly vary the force exerted on the push-rod by the diaphragm. In this way, the external load is automatically changed in accoradnce with variations in machine speed so as to maintain the lubricating film thickness between the desired limits.

If desired, pressure vessels may be used in several stages to control the external load in accordance with several parameters. For example, as shown in FIGURE 2, the cap 19 against which the spring 8 bears may be slidably mounted in the tubular member 20 and fastened to a diaphragm 21 of a second pressure vessel 22 similar to and disposed above the vessel 9. The pressures in the compartments of the two vessels are then caused to relate to two different parameters.

Refering to FIGURE 4, a film thickness detector 25, which may be capacitative or magnetic, is arranged to detect changes in the thickness of the lubricating film, without penetrating the film. The output of the detector is fed to a receiver 26 which transforms it into a voltage proportional to the film thickness. This voltage is used, by means of relays, to control a servo-motor 27 which adjusts the pre-loading means 8 to maintain the film thickness within the desired range.

We claim:

1. A hydrodynamic bearing comprising a plurality of bearing slippers disposed around the bearing axis at least one of which slippers is radially movable, pre-load means for applying an external load to said radially movable slipper urging it towards the bearing axis and means for automatically controlling the value of the external load applied by the pre-load means so as to maintain between pre-determined limits the thickness of the lubricant film established under hydrodynamic conditions, despite variation in one or more of the parameters on which the film thickness depends.

2. A hydrodynamic bearing comprising a plurality of bearing slippers disposed around the bearing axis at least one of which slippers is radially movable, pre-load means for applying an external load to said radially movable slipper urging it towards the bearing axis, and means responsive to variations in at least one selected parameter on which lubricating film thickness depends for controlling the value of the external load applied by the pre-load means so as to maintain between pre-determined limits the thickness of said lubricating film.

3. A hydrodynamic bearing comprising a plurality of bearing slippers disposed around the bearing axis at least one of which slippers is radially movable, loading means for applying an external load to said radially movable slipper urging it towards the bearing axis, a pressure vessel, a flexible diaphragm dividing the vessel into two compartments, means coupling the diaphragm to said loading means, and means for differentially varying pressures in said two compartments in accordance with variations in a parameter on which lubricating film thickness depends, whereby said external load is controlled and the film thickness maintained between predetermined limits.

4. A hydrodynamic bearing comprising a plurality of bearing slippers disposed around the bearing axis at least one of which slippers is radially movable, loading means for applying an external load to said radially movable slipper urging it towards the bearing axis, a pressure vessel, a flexible diaphragm dividing the vessel into two compartments, means coupling the diaphragm to said loading means, and connections between said compartments and the inlet and outlet respectively of a compressor, whereby said external load is controlled according to compressor speed and the lubricating film thickness is maintained between pre-determined limits.

5. A hydrodynamic bearing comprising a plurality of bearing slippers disposed around the bearing axis at least one of which slippers is radially movable, loading means for applying an external load to said radially movable slipper urging it towards the bearing axis, a plurality of pressure vessels, a flexible diaphragm dividing each vessel into two separate compartments, means coupling each diaphragm to said loading means, and means for differentially varying pressures in the compartments of the vessels in accordance with variations in respective parameters on which lubricating film thickness depends, whereby said external load is controlled and the film thickness maintained between pre-determined limits.

6. A hydrodynamic bearing comprising a plurality of bearing slippers disposed around the bearing axis at least one of which slippers is radially movable, pre-load means for applying an external load to said radially movable slipper urging it towards the bearing axis, and control means responsive to changes in lubricating film thickness for controlling the value of the external load applied by the pre-load means so as to maintain between pre-determined limits the thickness of said lubricating film.

7. A hydrodynamic bearing comprising a plurality of bearing slippers disposed around the bearing axis at least one of which slippers is radially movable, loading means for applying an external load to said radially movable slipper urging it towards the bearing axis, and control means responsive to changes in lubricating film thickness for controlling the value of the external load applied by the loading means so as to maintain between predetermined limits the thickness of said lubricating film, said control means comprising a film thickness detector and a servo-motor connected in a circuit whereby the servo-motor operates in accordance with signals from the detector, and means coupling the servo-motor to the loading means.

8. A hydrodynamic bearing for a rotating member, comprising a plurality of bearing slippers disposed around the bearing axis at least one of which slippers is radially movable, loading means incorporating pre-loaded spring means for applying an external load to said radially movable slipper urging it towards the bearing axis to provide journalling surfaces to said member in stationary and low speed conditions, and means for automatically controlling the value of the external load applied by the pre-loaded spring means so as to maintain between predetermined limits the thickness of the lubricant film established under hydrodynamic conditions, despite variation in one or more of the parameters on which the film thickness depends.

9. A hydrodynamic bearing comprising a plurality of bearing slippers disposed around the bearing axis at least one of which slippers is radially movable, loading means incorporating pre-loaded spring means for applying an external load to said radially movable slipper urging it towards the bearing axis, and means responsive to variations in at least one selected parameter on which lubricating film thickness depends for controlling the value of the external load applied by the pre-loaded spring means so as to maintain between predetermined limits the thickness of said lubricating film.

References Cited by the Examiner

UNITED STATES PATENTS

Re. 25,028   8/61   Thompson _____ 308—73
3,105,631   10/63   Hanny.

DON A. WAITE, *Primary Examiner.*

FRANK SUSKO, ROBERT C. RIORDON, *Examiners.*